(12) United States Patent
La et al.

(10) Patent No.: US 7,634,172 B1
(45) Date of Patent: Dec. 15, 2009

(54) METHODS FOR RECORDING MULTIPLE SESSIONS ON A REWRITABLE DVD DISC

(75) Inventors: Luke Kien La, Los Angeles, CA (US); Yaoyuan Tu, Cupertino, CA (US); Yau-Ting Mau, Fremont, CA (US)

(73) Assignee: Sonic Solutions, Inc., Novato, CA (US)

( * ) Notice: Subject to any disclaimer, the term of this patent is extended or adjusted under 35 U.S.C. 154(b) by 1554 days.

(21) Appl. No.: 10/185,305

(22) Filed: Jun. 26, 2002

(51) Int. Cl.
*H04N 5/91* (2006.01)

(52) U.S. Cl. .................. 386/94; 386/126; 386/95; 386/111; 386/125; 386/83

(58) Field of Classification Search ............ 386/94–95, 386/60, 46, 126, 83, 125, 111
See application file for complete search history.

(56) References Cited

U.S. PATENT DOCUMENTS

| | | | |
|---|---|---|---|
| 5,341,356 A * | 8/1994 | Dieleman et al. | 369/47.54 |
| 5,878,019 A * | 3/1999 | Schylander et al. | 369/30.12 |
| 7,010,217 B2 * | 3/2006 | Kikuchi et al. | 386/95 |
| 7,065,535 B2 * | 6/2006 | Tol et al. | 707/200 |
| 7,139,763 B1 * | 11/2006 | La | 707/100 |
| 7,437,059 B1 * | 10/2008 | La et al. | 386/126 |

OTHER PUBLICATIONS

Optical Storage Technology Association (OSTA) "Universal Disk Format Specification, OSTA-2, revision 2.00" OSTA, 1998, XP002113791.*

"Volume and File Structure for Write-Once and Rewritable Media Using Non-Sequential Recording for Information Interchange," ECMA Standardizing Information and Communication Systems, Standard ECMA-167, 3rd Edition, Jun. 1997.*

Andar Marken, "CD-Rewritable: The Storage Revolution Continues," Micrographics and Optical Technology, vol. 16, No. 1&2, 1998.*

* cited by examiner

*Primary Examiner*—Thai Tran
*Assistant Examiner*—Helen Shibru
(74) *Attorney, Agent, or Firm*—Martine Penilla & Gencarella, LLP

(57) ABSTRACT

A software driven method for recording multiple sessions on a rewritable DVD is provided. Examples include a software-driven method for appending data to rewritable DVD disc. A rewritable DVD disc for recording, wherein the rewritable DVD disc contains previously written data is received for appending data. A request to append new data to the rewritable DVD disc is received. A file system for the previously written data is located and includes a pointer to the start of the file system. The file system for the previously written data is then read. The file system is modified to continue pointing to files associated with the previously written data and to generate pointers to files of the new data. An updated file system and the new data to the rewritable DVD disc are logically written after the previously written data. The pointer of the file system is then modified to refer to the updated file system.

19 Claims, 6 Drawing Sheets

METHODS FOR RECORDING MULTIPLE SESSIONS ON A REWRITABLE DVD DISC

BACKGROUND OF THE INVENTION

1. Field of the Invention

The present invention relates generally to the recording of data to optical media, and more specifically to a method for recording data to a rewritable DVD disc having a previously written session or sessions.

2. Description of the Related Art

Currently, rewritable DVD discs provide the user with storage capacities of up to 4.3 Gigabytes on a single side. This would potentially allow users to store much more data than on conventional CD-ROMs. However, certain limitations on the current reading capability of the rewritable DVD disc does not allow the user to realize this full potential.

As is well known, there are several types of optical media standards to define structure and format on optical media to ensure compatibility across disparate operating systems, components, and devices. One standard that covers rewritable DVD discs is UDF (Universal Disc Format). UDF Revision 1.02 applies to rewritable DVD discs that have data and video capability. However, working with the UDF Revision 1.02 has limitations.

During the operation of reading data from the rewritable DVD disc, the following steps occur. When the DVD is first read the session is searched for a file system. The file system contains an anchor. The anchor contains pointers. Each pointer acts like a map and points to the location of the files or data, which have been stored on the disc. The problem is that when the disc is read it will always go to the file system associated with a first recorded session. Once a first session is closed, the file system is no longer updated. So even if data is appended after the first session the first file system's anchor pointers will only point to the data files of the first session.

For example, the user could write a small 200 Megabyte file in a first session and then will not be able to store subsequent files due to the limitations discussed above. This would leave the remaining more than 4 Gigabytes as wasted space. As can be appreciated, this drawback defeats one of the main purposes of the innovation of DVD technology, which is increased storage capacity.

In view of the foregoing, what is needed is a method and system for enabling the recording of multiple sessions onto a rewritable DVD disc, and allowing the later reading of data stored in all recorded sessions.

SUMMARY OF THE INVENTION

Broadly speaking, the present invention fills these needs by providing a method, apparatus, and computer program for enabling the recording of multiple sessions onto a rewritable DVD disc, and allowing the later reading of data stored on all recorded sessions. The present invention can be implemented in numerous ways, including as a process, an apparatus, a system, a device, a method, or a computer readable media. Several embodiments of the present invention are described below.

In one embodiment, a software-driven method for appending data to rewritable DVD disc is provided. A rewritable DVD disc for recording, wherein the rewritable DVD disc contains previously written data is received for appending data. A request to append new data to the rewritable DVD disc is received. A file system for the previously written data is provided. The file system includes a pointer to the start of the file system. The file system for the previously written data is then read. The file system is modified to continue pointing to files associated with the previously written data and to generate pointers to files of the new data. The updated file system and the new data to the rewritable DVD disc are logically written after the previously written data. The pointer of the file system is modified to refer to the updated file system.

In another embodiment, a computer driven method for recording data to an optical disc is provided. An optical disc having previously written data is detected. The previously written data is managed by a file system within a closed session. An updated file system is written after the previously written data, and the updated file system includes updated pointers to the previously written data. The new data written after the closed session and data of the closed session will be managed by the updated file system.

In another embodiment, a software driven method for appending data to a DVD disc is provided. The DVD disc is received for writing, and the DVD disc contains a last closed session. A request to append new data to the DVD disc is detected. A file system for the last closed session is then located. A first file system is then located. The first file system includes an anchor pointing to the start of the file system. The method then proceeds to read the file system for the last closed session. The file system is then modified to continue pointing to a location of files associated with the last closed session and to generate pointers to locations of files of the new data. The updated file system and the new data are written to the DVD disc logically after the last closed session. The anchor of the first file system is then modified to refer to the updated file system.

In still a further embodiment, a computer readable media having program instructions for recording data to an optical disc is provided. The program instructions detect an optical disc having previously written data, the previously written data is managed by a file system within a closed session. The program instructions write an updated file system after the previously written data, and the updated file system includes updated pointers to the previously written data. The program instructions enable the writing of new data to the optical disc after the closed session, and the new data is managed by the updated file system. The program instructions update a pointer of the file system to refer to the updated file system.

The advantages of the present invention are numerous. One notable benefit and advantage of the invention is the user can save any number of sessions, each session having any number of files, and then later access any file of any session that may be written to a rewritable DVD disc. This, of course, will enable the use of the entire rewritable DVD disc storage space. Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for recording data to an optical disc having previously recorded session(s), and the enabling of subsequent reading of all data recorded to the optical disc is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
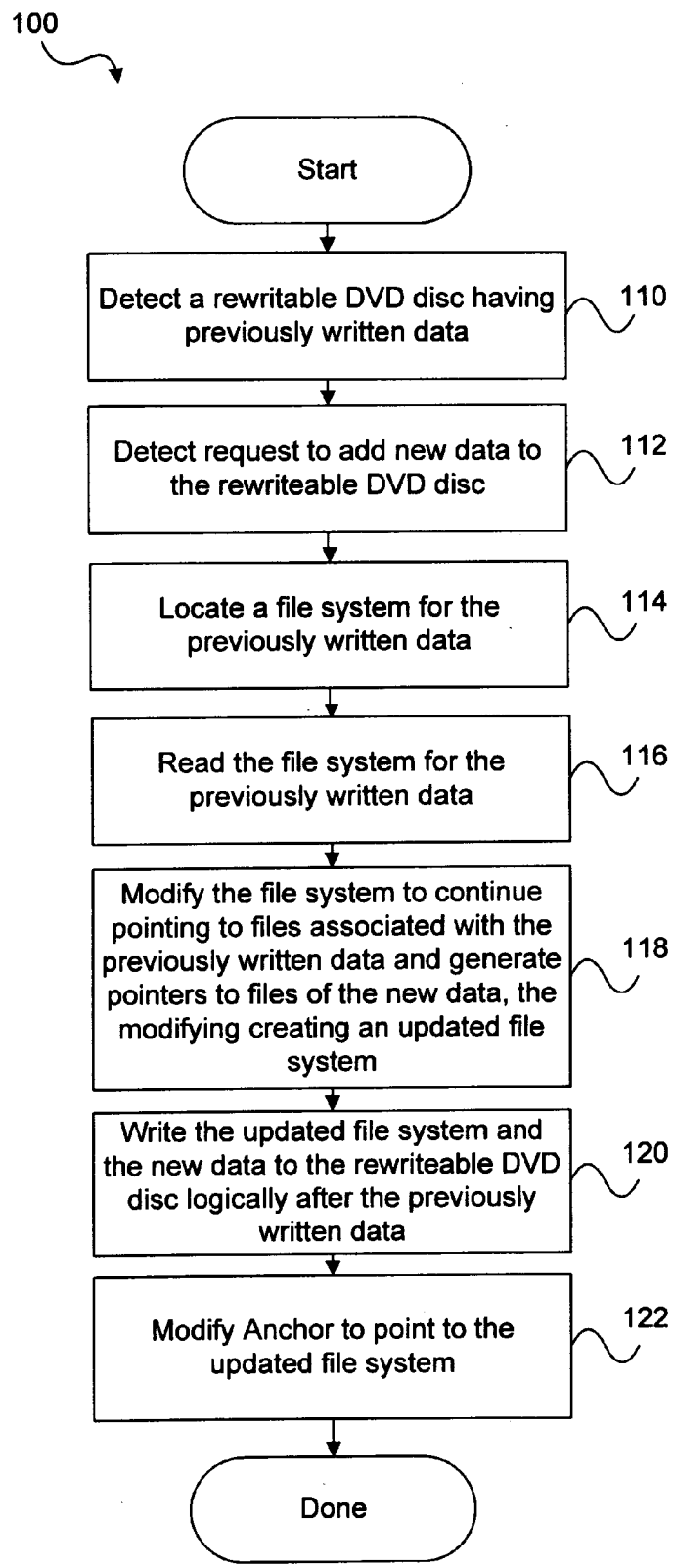
FIG. 1 shows a flow chart diagram illustrating the method of operations performed to update a file system so as to enable the reading of existing data and new data, in accordance with one embodiment of the invention.

FIG. 1 is a flow chart diagram 100 illustrating the method of operations performed to update a file system so as to enable the reading of existing data and new data in accordance with one embodiment of the invention. The method begins with operation 110, in which a rewritable DVD disc having previously written data is detected by a DVD reader. For example, a user could insert a rewritable DVD disc into a drive coupled to a computing system. The computing system can be a desktop computer system, a portable computing device, etc. A software reader can then be used to access files on the DVD disc. The reader, in this embodiment, will refer to the file system stored on the DVD disc to access previously recorded file data, which can include video data.

Once the rewritable DVD disc containing previously written data is detected by the DVD reader, the method advances to operation 112, in which a request to add new data to the rewritable DVD disc is detected. For example, a user could be attempting to record a new file or files to the rewritable DVD disc, which has a previously recorded closed session or sessions. Assuming the request for the recording of the new data is detected, the method advances to operation 114.

In operation 114, a file system for the previously written session is located. After the previously written session is located, the method advances to operation 116. In operation 116, a file system for the previously written session is read. Once the file system for the previously written session has been read into memory, the method advances to operation 118.

In operation 118 the file system in memory is modified to generate pointers to the new data files, while maintaining the pointers to the files of the previously written session. As is well know, the updated file system will function as a map to keep track of all new and previously recorded files, no matter in which session they were previously recorded. This modification therefore results in an updated file system. After the file system has been modified, the method advances to operation 120.

In operation 120, the updated file system, along with the new data is written to the rewritable DVD disc. In one embodiment, the data is written logically after the previously written session. Logically, all new data, including the updated files system is written in a location after the session border, which delineates the end of a previous session. After the updated file system and the new data have both been written to the rewritable DVD disc, logically after the previously written data the method advances to operation 122.

In operation 122, the anchor of the first recorded session is modified to point to the updated file system. The updated file system can be for a second session, a third session, a forth session, etc., but the anchor of the first session's file system is always modified after the recording of a new session. In this manner, the anchor of the first session will always point to the updated file system of the last recorded session. Once the anchor has been modified, the method will be done. Thus, the DVD disc can now be read by a reader, and the reader will be able to read file data associated with any session recorded thereon. This method will therefore advantageously allow the use of the entire DVD disc capacity.

Figure 2A:
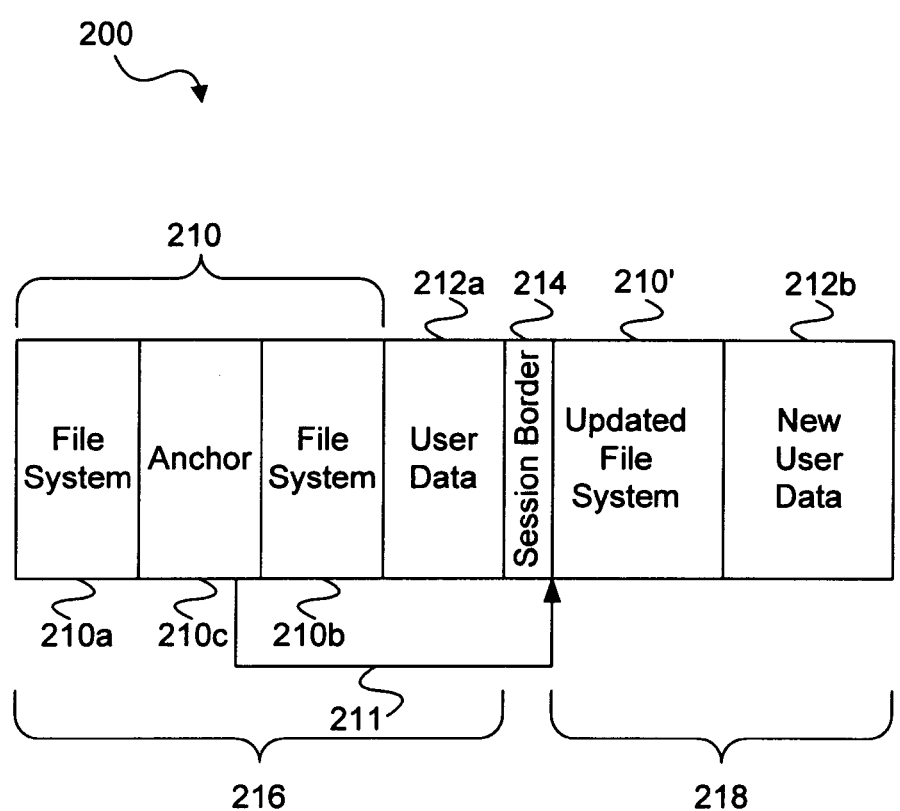
FIG. 2A shows a block diagram illustrating the general organization of data as recorded on the rewritable DVD disc in two sessions, in accordance with one embodiment of the invention.

FIG. 2A shows a block diagram 200 illustrating the general organization of data as recorded on the rewritable DVD disc in two sessions in accordance with one embodiment of the invention. As represented in block diagram 200, two sessions 216 and 218 are separated by a session border 214. The size of a session, the size of a border 214, and the potential number of sessions recorded to the rewritable DVD disc are variable. A file system 210 contains a section having an anchor 210c and non-anchor sections 210a and 210b. The non-anchor sections, 210a and 210b of the file system 210 contain file system components. The non-anchor sections 210a and 210b of the file system 210 can vary in size and location. The relative positions of the anchor 210c and the non-anchor sections 210a and 210b of the file system 210 can vary in relative size and position to each other, however in combination they compose the file system 210. User data, such as written data files are represented by 212a. The function of the anchor 210c is to point to the beginning of the file system 210. An anchor is basically a type of pointer. Accordingly, "anchor" is only used herein as an example, relative to the UDF specification discussed above. It should therefore be understood that other specifications may well have other terminology for defining a pointer, pointers, or links that define the beginning of file system components.

In accordance with the claimed invention, a second session 218 is composed of an updated file system 210' and new user data 212b. The updated file system 210' represents a file system which has been updated to reflect the location of previously written data of the first session 216 as well as the new user data 212b. The updated file system 210' will be described in further detail with reference to FIG. 2C. The new user data 212b is the second set of data saved to the disc by the user in the second session 218.

Figure 2B:
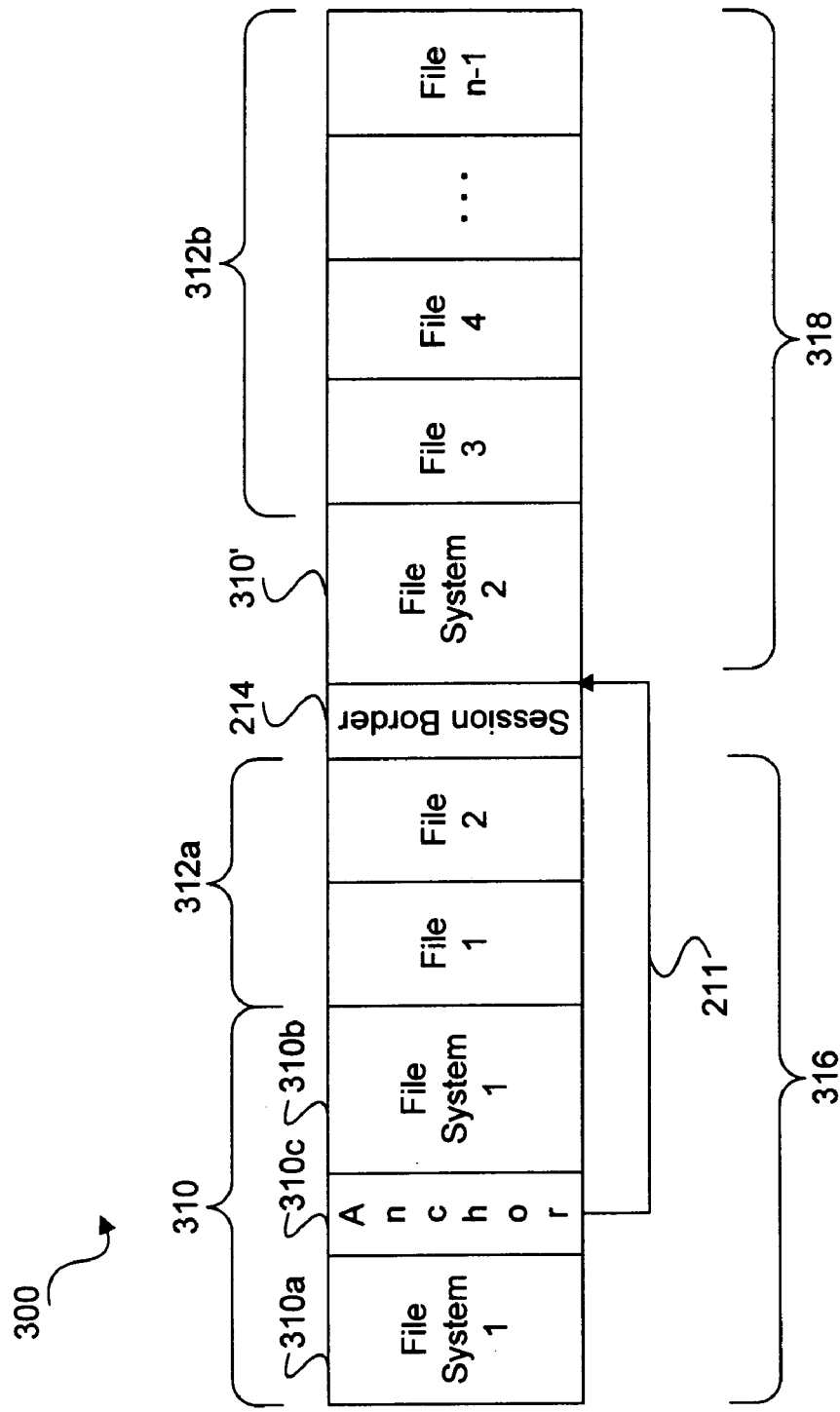
FIG. 2B shows a block diagram of data illustrating the general organization of data as recorded on a rewritable DVD disc in multiple or n sessions, in accordance with one embodiment of the invention.

FIG. 2B shows a block diagram 300 of data illustrating the general organization of data as recorded on a rewritable DVD disc in multiple or n sessions, in accordance with one embodiment of the invention. As represented in block diagram 300, a first session is 316. The first session 316 is composed of a file system 310 which is made up of an anchor 310c and non-anchor sections 310a and 310b. Non-anchor sessions are commonly known as volume descriptors, and other components which are well defined in the UDF specification, and other optical disc recording specifications. In this example, a first set of user data 312a is made up of file one and file two. The first session 316 is separated from a second session 318 by a session border 214. The second session 318 is composed of a file system 310'. The second session 318 can be composed of multiple files (n), which make up a second set of user data 312b.

Figure 2C:
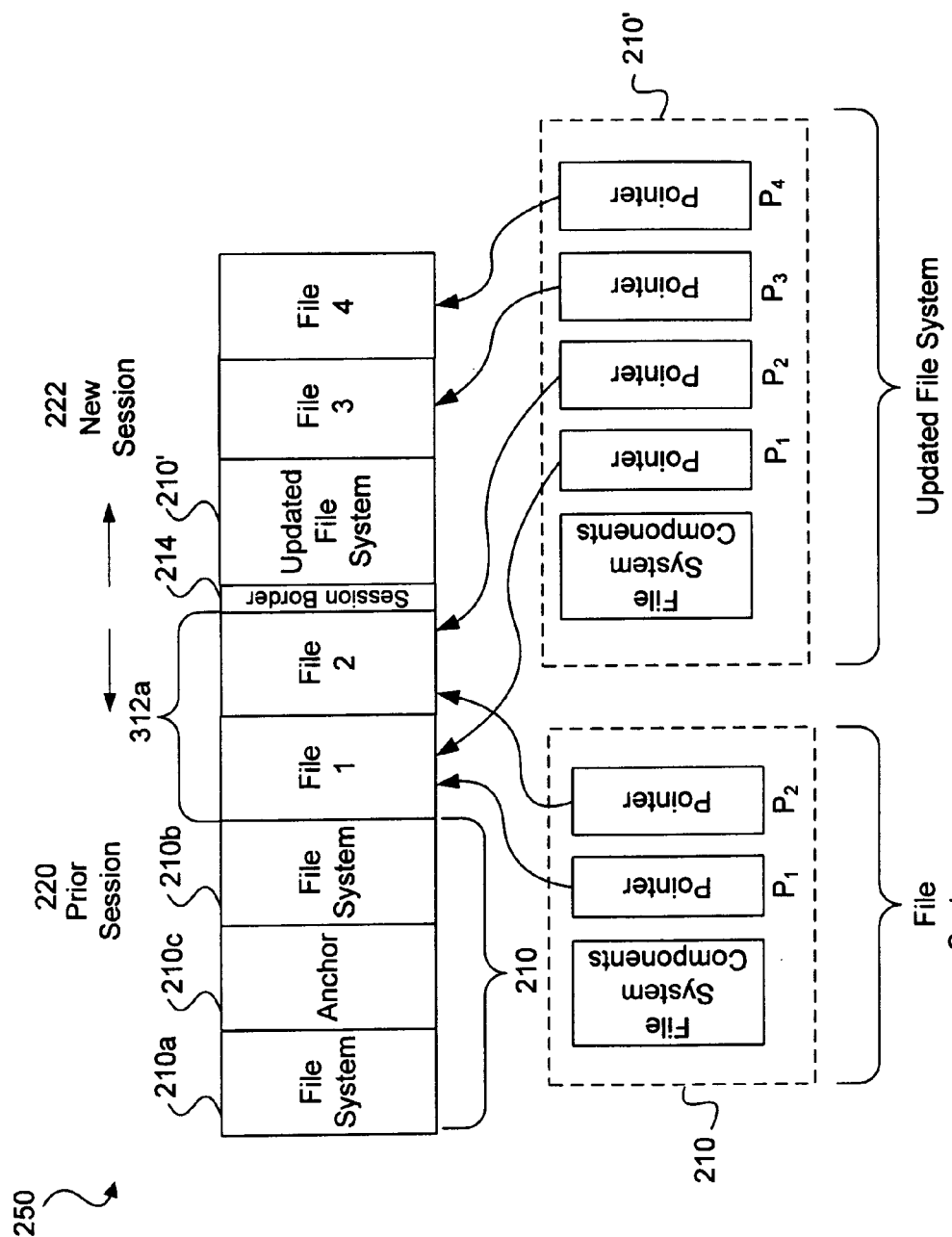
FIG. 2C shows a block diagram of data illustrating the general organization of data as recorded on the rewritable DVD disc in a prior session and a new session, in accordance with one embodiment of the invention.

FIG. 2C shows a block diagram 250 of data illustrating the general organization of data as recorded on the rewritable DVD disc in two sessions, a prior session 220 and a new session 222, in accordance with one embodiment of the invention. As represented in data diagram 250, the prior session 220 is made up of a file system 210 and a first set of user data 312a, which is composed, in this example, of two files, file one and file two. The file system 210 contains the anchor 210c and non-anchor sections 210a and 210b. The anchor 210c, as mentioned above, is generically known as a pointer. The non-anchor sections 210a and 210b of the file system 210 contain file system components. The function of the file system 210 is to point to the user data 312a. This is accomplished by pointers $P_1$ and $P_2$ shown in an exploded detail view of file system 210. The pointers refer to a corresponding file of the first set of user data 312a. For example, pointer $P_1$ points to the location of File 1, and pointer $P_2$ points to the location of File 2.

Continuing with the description of FIG. 2C, the two sessions are separated by the session border 214. The new session 222 contains an updated file system 210'. The updated file system 210' contains the file system components of the first file system 210 as well as existing pointers to data files. The updated file system 210' saves the pointers $P_1$ and $P_2$ from the first file system 210 of the prior session 220 and adds new pointers $P_3$ and $P_4$, which point to new files saved to the new session, file 3 and file 4. In the past, a file system could not be updated with new pointers, and thus the contents of a file system could never change. The file system would only have the original pointers $P_1$ and $P_2$ and therefore new data files such as file 3 and 4 could not be located. With the new capability of updating the file system with additional pointers new files in new sessions can be located. Now the entire disc space can be used since the data files in new sessions, which are appended, can be located with the updated file system of the last written session.

Figure 3:
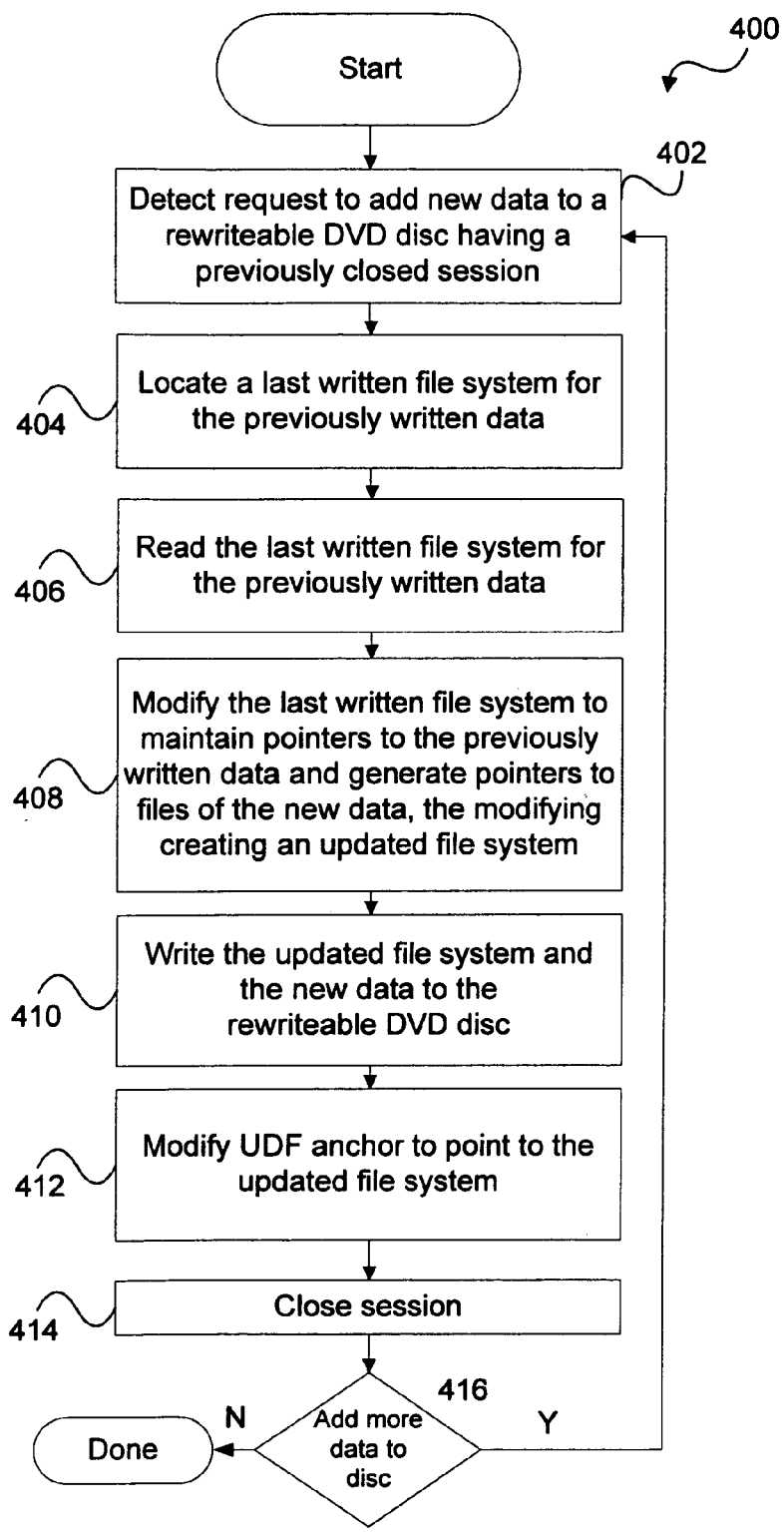
FIG. 3 shows a flow chart diagram illustrating the method of operations performed to update a file system and modify an associated UDF anchor so as to point to the updated file system, in accordance with one embodiment of the invention.

FIG. 3 is a flow chart diagram 400, illustrating the method of operations performed to update a file system and modify an associated UDF anchor so as to point to the updated file system, in accordance with one embodiment of the invention. The method begins with operation 402, in which a request to add new data to a rewritable DVD disc having a previously closed session is detected by a DVD reader. For example, a user could be attempting to record a new file or files to the rewritable DVD disc, which has a previously recorded closed session or sessions. Assuming the request for new data is detected, the method advances to operation 404.

In operation 404, the last written file system for the previously written data is located. Assuming the last written file system for the previously written data is located, the method advances to operation 406.

In operation 406, the last written file system for the previously written data is read into memory. Once the last written file system for the previously written data has been read, the method advances to operation 408.

In operation 408, the last written file system in memory is modified to generate pointers to the new data files, while maintaining the pointers to the files of the previously written session. As is well known, the updated file system will function as a map to keep track of all new and previously recorded files, no matter in which session they were previously recorded. This modification therefore results in an updated file system. After the last written file system has been modified, the method advances to operation 410.

In operation 410, the updated file system along with the new data is written to the rewritable DVD disc. The updated file system is saved in a location after the previous session border, which delineates the end of a previous session. The new data is saved in a location after and next to the updated file system. After the updated file system and the new data have both been written to the rewritable DVD disc, the method advances to operation 412.

In operation 412, the UDF anchor of the first written closed session is modified to point to the updated file system. The updated file system can be for a second session, a third session, a forth session, etc., but the UDF anchor of the first session's file system is always modified after the recording of a new session. In this manner, the UDF anchor of the first session will always point to the last updated file system of the last recorded session. After the UDF anchor has been updated, the method advances to operation 414.

In operation 414, the session is closed. The session is closed by placing a session border after the new data of the current session. After the session has been closed, the method advances to decision 416.

At decision 416 it is determined if the user desires to add more data to the disc. If there is no more data to add to the disc, a "no" to decision 416, the method is done. If it is determined that there is more data to add to the disc, a "yes" to decision 416, the method returns to operation 402.

Figure 4:
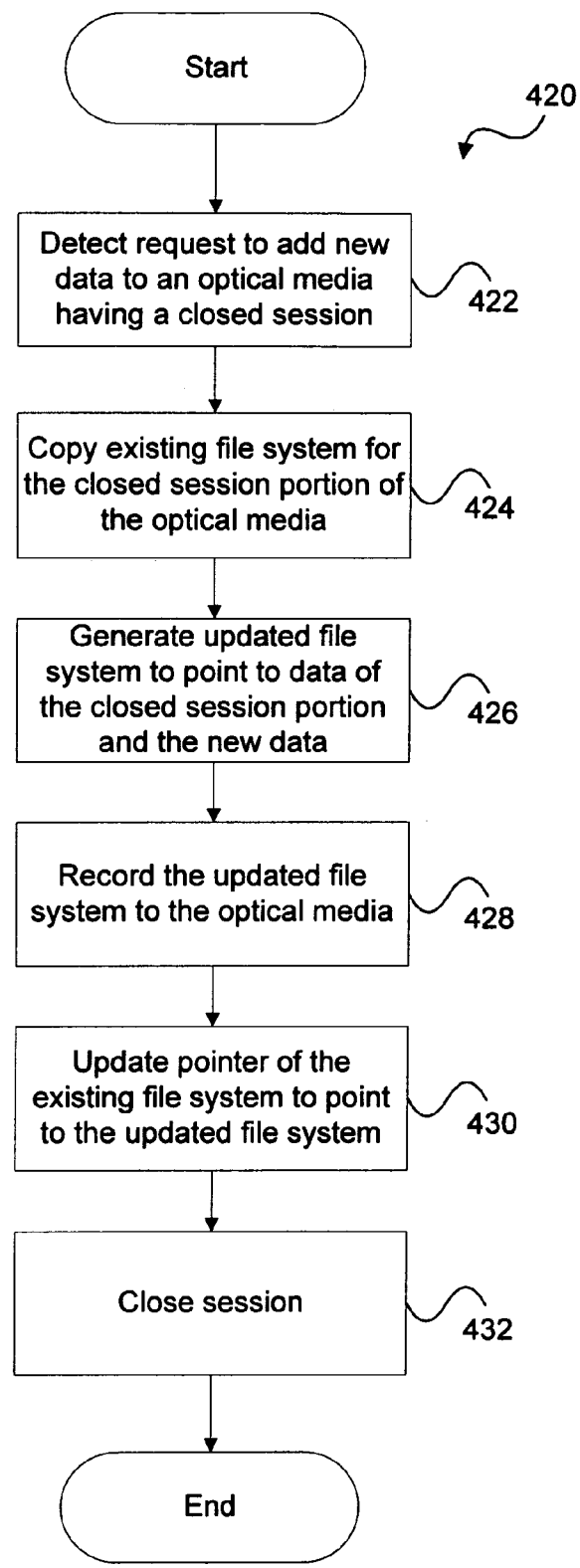
FIG. 4 shows a flow chart diagram illustrating the method of operations performed to an optical media to update pointers to a file system so as to continue pointing to the closed session portion as well as the new data and update the anchor to the first file system to point to the updated file system, in accordance with one embodiment of the invention.

FIG. 4 is a flow chart diagram 420, illustrating the method of operations performed to an optical media to update pointers to a file system so as to continue pointing to the closed session or sessions as well as the new data and update the anchor to the first file system to point to the last updated file system, in accordance with one embodiment of the invention. The method begins with operation 422, in which a request to add new data to an optical media having a closed session is detected. For example, a user could be attempting to record a new file or files to an optical media, which has a previously recorded closed session or sessions. After the request to add new data to an optical media having a closed session is detected, the method advances to operation 424.

Operation 424 copies the existing file system for the closed session portion of the optical media. After the existing file system for the closed session portion of the optical media has been copied, the method advances to operation 426. Operation 426 generates an updated file system to point to data of the closed session portion as well as the new data. After the updated file system is generated, the method advances to operation 428. Operation 428, records the updated file system to the optical media. After the updated file system is recorded to the optical media, the method advances to operation 430.

Operation 430 updates the pointer to the existing file system to point to the updated file system. After the pointer to the existing file system is updated to point to the updated file system, the method advances to operation 432. The session is closed at operation 432. Then the method ends.

As described above, it is believed that the utilization of the rewritable DVD disc can be significantly increased by 1) updating a file system's pointers, and 2) modifying an anchor or pointer of the first session or a previous session to point to the last updated session. As a result, multiple sessions containing any number of files can be saved and retrieved from a rewritable DVD disc.

Each of the methods described above enable the recording of multiple sessions onto a rewritable DVD disc, and allow the subsequent reading of data stored in all recorded sessions, and further allow the user to save and fully access multiple sessions of a recorded rewritable DVD disc. This enables the full utilization of the disc's entire storage space. Since one of the advantages of the rewritable DVD disc technology is its large capacity for data storage, it is essential to be able to utilize this capacity.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, FLASH, EEPROMs, CD-ROMs, CD-Rs, CD-RWs, DVDs, magnetic tapes, and other optical data storage devices.

The invention has been described herein in terms of several exemplary embodiments. Other embodiments of the invention will be apparent to those skilled in the art from consideration of the specification and practice of the invention. For instance, other recording standards, such as ISO 9660, Joliet, HFS for Macintosh, etc., may benefit from the teachings defined herein. Therefore, the embodiments and preferred features described above should be considered exemplary, with the invention being defined by the appended claims and equivalents thereof.

What is claimed is:

1. A software driven method for appending data to rewritable DVD disc, the method comprising:
    receiving a rewritable DVD disc for recording, wherein the rewritable DVD disc contains previously written data;
    detecting a request to append new data to the rewritable DVD disc;
    locating a file system for the previously written data, the file system including a pointer to the start of the file system;
    reading the file system for the previously written data;
    modifying the file system to continue pointing to files associated with the previously written data and to generate pointers to files of the new data;
    writing an updated file system and the new data to the rewritable DVD disc logically after the previously written data, wherein the updated file system includes pointers tracking all previously written data and the new data; and
    modifying the pointer of the file system to refer to the updated file system.

2. The software driven method as recited in claim 1, wherein the pointer that defines the start of the file system is an anchor.

3. The software driven method as recited in claim 1, wherein the previously written data is part of a closed session.

4. The software driven method as recited in claim 1, wherein the writing of the updated file system further comprising:
    writing the modified file system having pointers to files associated with the previously written data.

5. The software driven method as recited in claim 1, wherein each of the file system and the updated file system is of an optical disc format.

6. The software driven method as recited in claim 1, wherein the optical disc format is a Universal Disc Format.

7. A computer driven method for recording data to an optical disc, comprising:
    detecting an optical disc having previously written data, the previously written data being managed by a file system within a closed session;
    writing an updated file system after the previously written data, the updated file system maintaining pointers to all previously written data and generating pointers to the new data;
    enabling writing of new data to the optical disc after the closed session, the new data being managed by the updated file system; and
    updating a pointer which points to the file system of the previously written data to refer to the updated file system.

8. The computer driven method as recited in claim 7, wherein the optical disc is a rewritable DVD disc.

9. The computer driven method as recited in claim 7, wherein the optical disc format is a Universal Disc Format.

10. The computer driven method as recited in claim 7 wherein the pointer is an anchor.

11. A software driven method for appending data to a DVD disc, the method comprising:
    receiving the DVD disc for writing, wherein the DVD disc contains a last closed session;
    detecting a request to append new data to the DVD disc;
    locating a file system for the last closed session;
    locating a first file system, the first file system including an anchor pointing to the start of the file system;
    reading the file system for the last closed session;
    modifying the file system to continue pointing to a location of files associated with the last closed session and to generate pointers to locations of files of the new data;
    writing an updated file system and the new data to the DVD disc logically after the last closed session, wherein the updated file system includes pointers tracking all previously written data and the new data; and
    modifying the anchor of the first file system to refer to the updated file system.

12. The software driven method as recited in claim 11, wherein the DVD disc format is a Universal Disc Format.

13. Computer readable media having program instructions for recording data to an optical disc, comprising:
    program instructions for detecting an optical disc having previously written data, the previously written data being managed by a file system within a closed session;
    program instructions for writing an updated file system after the previously written data, the updated file system maintaining pointers to all previously written data and generating pointers to the new data;

program instructions for enabling writing of new data to the optical disc after the closed session, the new data being managed by the updated file system; and program instructions for updating a pointer which points to the file system of the closed session to refer to the updated file system.

14. The computer readable media as recited in claim 13, wherein the optical disc format is a Universal Disc Format.

15. The computer readable media as recited in claim 13, wherein the optical disc is a rewritable DVD disc.

16. The computer readable media as recited in claim 13, wherein pointers to previously written data track all previously written data no matter which session the previously written data was recorded, and the pointer of the file system is u dated from pointing to the file system within the closed session to point to the updated file system.

17. The software driven method as recited in claim 1, wherein tracking all previously written data occurs no matter which session the previously written data was recorded, and the pointer of the file system is modified from pointing to the file system for the previously written data to point to the updated file system.

18. The computer driven method as recited in claim 7, wherein pointers track all previously written data no matter which session the previously written data was recorded.

19. The software driven method as recited in claim 11, wherein tracking all previously written data occurs no matter which session the previously written data was recorded, and the anchor is modified from pointing to file system of the last closed session to point to the updated file system.

* * * * *